United States Patent
Crooker et al.

(10) Patent No.: US 11,453,990 B2
(45) Date of Patent: Sep. 27, 2022

(54) PROCEDURE TO USE THE TAILINGS AS CONSTRUCTION MATERIAL GIVING IT WATERPROOFING CHARACTERISTICS AND REDUCE ITS CRACKING

(71) Applicant: CULTIVOS HIDROBIOLOGICOS Y BIOTECNOLOGIA AGUAMARINA S.A., Antofagasta (CL)

(72) Inventors: Pamela Chavez Crooker, Antofagasta (CL); Johanna Obreque Contreras, Antofagasta (CL); Sergio Herrera Astudillo, Antofagasta (CL); Andrea Eusebia del Milagro Contreras Vera, Antofagasta (CL); Luis Carrera del Canto, Antofagasta (CL)

(73) Assignee: CULTIVOS HIDROBIOLOGICOS Y BIOTECNOLOGIA AGUAMARIN S.A., Antofagasta (CL)

( * ) Notice: Subject to any disclaimer, the term of this patent is extended or adjusted under 35 U.S.C. 154(b) by 0 days.

(21) Appl. No.: 16/366,903

(22) Filed: Mar. 27, 2019

(65) Prior Publication Data

US 2019/0301124 A1    Oct. 3, 2019

(30) Foreign Application Priority Data

Mar. 27, 2018 (CL) .................................... 789-2018

(51) Int. Cl.
*C04B 24/12* (2006.01)
*E02D 3/12* (2006.01)
*C04B 16/04* (2006.01)
*C04B 18/12* (2006.01)

(52) U.S. Cl.
CPC .............. *E02D 3/123* (2013.01); *C04B 16/04* (2013.01); *C04B 18/12* (2013.01); *Y02W 30/91* (2015.05)

(58) Field of Classification Search
CPC ....... E02D 3/12–126; C04B 18/12; C12P 3/00
See application file for complete search history.

(56) References Cited

U.S. PATENT DOCUMENTS

| | | | | |
|---|---|---|---|---|
| 5,965,422 A * | 10/1999 | Loffler | ..................... | C12N 9/18 435/198 |
| 6,221,650 B1 * | 4/2001 | Rehberger | ................ | C05F 3/00 435/252.4 |
| 9,328,473 B2 * | 5/2016 | Esnault | .................. | C09K 17/42 |

(Continued)

OTHER PUBLICATIONS

Burbank, et al. Precipitation of Calcite by Indigenous Microorganisms to Strengthen Liquefiable Soils Geomicrobiology Journal, 28:301-312, 2011 (Year: 2011).*

*Primary Examiner* — Janine M Kreck
(74) *Attorney, Agent, or Firm* — Hoglund & Pamias, PSC; Roberto J. Rios

(57) ABSTRACT

A process to use the tailings as construction material giving it waterproofing characteristics and reduce its cracking is presented. For example, to use the mining tailing as a construction material conceding to it impermeabilizing features, reducing its cracking and increasing its resistance. The main stages of said process are to apply a calcium-containing solution to the soil to be treated; apply a solution that that contains calcite-producing bacteria, to the soil to be treated; optionally, add maltodextrin; and stabilize, compact and dry off the mix.

6 Claims, 3 Drawing Sheets

(56) References Cited

U.S. PATENT DOCUMENTS

| | | | |
|---|---|---|---|
| 2008/0298901 A1* | 12/2008 | Hamelin | E02D 3/12 405/264 |
| 2014/0238267 A1* | 8/2014 | Bang | C12N 1/20 106/162.2 |
| 2019/0106717 A1* | 4/2019 | Dosier | C04B 28/10 |

* cited by examiner

PROCEDURE TO USE THE TAILINGS AS CONSTRUCTION MATERIAL GIVING IT WATERPROOFING CHARACTERISTICS AND REDUCE ITS CRACKING

CROSS-REFERENCE TO RELATED APPLICATION(S)

This application claims the benefit of Chilean Patent Application No. CL-789-2018 filed Mar. 27, 2018, the contents of which is hereby incorporated by reference in its entirety.

FIELD OF THE INVENTION

The present invention, in general terms, refers to a procedure or process to use the mining tailings as a construction material giving waterproofing features, reducing its cracking and increasing its resistance, by the application of solutions that contain calcium and calcite-producing microorganisms, and in case of higher resistance requirements the application of maltodextrin-containing solutions.

BACKGROUND OF THE INVENTION

The capacity of growing in mining extraction operations, such as copper mining, depends directly in the capacity to deposit its solid residues, known as mining tailings. Typically, the mining tailings are directed to the formation of a reservoir where a separation of solids and water occurs. In an optimum scenario, water must be recovered and reincorporated to the operation.

An appropriate water availability and management is a key factor to the sustainability of the extraction process of minerals. As it's known, national mining activity es developed mainly in the north region of the country, a region that has a limited availability of water. In the current operations, is it possible to recover a 30% of the water that is deposited, together with solids, in the reservoirs. In some cases, no recuperation is done, and all the water is loss by evaporation as part of the whole process.

One of the major water loses occurs by direct contact between the lagoon and the natural soil, that will depend on the extension of the contact zone and the soils in terms of hydraulic permeability. The technique currently used to control the filtration process is to impermeabilize the soil by means of a HDPE carpet or geomembrane. Apply this geomembrane to 30 hectares has an approximately final cost of US$36 million every two years for an operation.

Another important loss is the one occurring in the deposited mining tailing, once a discharge is activated in a sector that has been in dry during a time. Under these circumstances, a loss for re-deposition occurs. Depending on the exposition time and the characteristics of the deposited mining tailing, a surface cracking is produced, and depending on the severity of this cracking, a loss of water occurs, because the water will tend to fill these cracks. This water loss is classified in the category of beach re-saturation. The existence of high depth cracks causes that water runs through them, without reaching its way to the water recovery lagoon.

The search of a technologic solution in this matter, points to utilize tailing-soil mixes proper to the geographic zone in which the operation is performing and some additive that allows the impermeabilization of the place, that will considerably reduce the costs in comparison to the use of geomembranes. To reduce to water permeabilization and cracking problem, the present application for invention patent proposes a procedure to use the mining tailing as construction material, conceding to said mining tailing impermeabilization properties and reducing its cracking by the application of a calcium-containing solution, followed by the application of a solution that contains calcite-producing bacteria, with the aim to stabilize the soil to be treated.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present disclosure refers in one or more embodiments, to a process to use the mining tailing as a construction material conceding to it impermeabilizing features, reducing its cracking and increasing its resistance. The main stages of said process are described below:

a) apply a calcium-containing solution to the soil to be treated;
b) apply a solution that that contains calcite-producing bacteria, to the soil to be treated;
c) optionally, add maltodextrin; and
d) stabilize, compact and dry off the mix.

DETAILED DESCRIPTION OF THE INVENTION

The present invention refers to a process to use the mining tailing as a construction material, conceding to it impermeabilizing features and reducing its cracking, that includes the stages of:

a) Apply to the soil to be treated a solution that contains 25000 ppm of calcium, using an irrigation rate from 40 to 150 $L/m^2$;
b) Apply to the soil to be treated a solution that includes calcite-producing bacteria selected from genus *Bacillus* or *Sporosarcina*, using an irrigation rate from 40 to 150 $L/m^2$;
c) In case to be required, apply maltodextrin in a percentage of 30% w/v to the bacterial solution.

d) stabilize the treated soil at room temperature for 24 to 72 hours;

e) stabilization, compaction and dry off.

The applications of solutions of stages a) and b) is done by aspersion, mix, irrigation, or combinations thereof.

Microorganisms included in the solution of stage b) are selected from native calcite-producing bacteria from genus *Bacillus* or *Sporosarcina*, or combinations thereof.

EXAMPLES

Example 1: Bacterial Growth in Waters from Mining

The growth of the bacteria used in this invention was evaluated in industrial water supplemented with industrial nutrients. Different physical-chemistry parameters were monitored, previous to the study of bacterial growth in this industrial water, and then the incubation and growing of the microorganism. Results are shown in table No 1.

TABLE NO 1

Measure of pH, dissolved oxygen and conductivity previous of bacterial incubation and after 0, 24 and 96 hours of bacterial growth.

|  | pH | Dissolved $O_2$ (mg/L) | Conductivity (mS/cm) |
| --- | --- | --- | --- |
| Previous | 6.31 | 7.79 | 8.83 |
| 0 hrs. | 8.7 | 3.72 | 20.4 |
| 24 hrs. | 9.14 | 0.25 | 36.7 |
| 96 hrs. | 9.16 | 2.85 | 38.2 |

An increase in pH is registered in the bacterial culture, because of the release of components that increases pH to values over 9. Dissolved oxygen decreases at 24 hours due to the aerobic nature of bacteria assayed; however, an increase was observed at 96 hours, indicating that the bacteria is in death phase. It is known that carbonate metabolism has already generated, so the bacterial death does not affect the final product nor the effectivity of the proposed process. Finally, an increase in conductivity was observed due to generation of metabolites.

Figure 1:
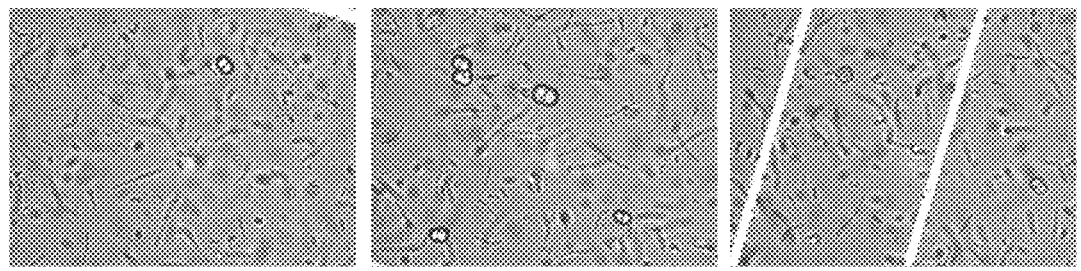
FIG. 1 shows microscopic images with a magnification of 100×, of the bacterial culture prepared with mining industrial water.

Additionally, photographs were taken to the bacterial culture prepared with water coming from mining, to verify the presence of the bacteria of interest. Is it known that they have a bacillar morphology, and that forms diplo and *streptobacillus* groups, that is observed in high bacterial density in FIG. 1, with the morphology and grouping typical of the bacteria of interest. The obtained results indicate that water coming from mining, is suitable for growing the microorganisms of interest.

Example 2: Proctor Standard Assay (NCh 1534/2 of 79)

The amount of water in the material mixes necessary for the maximal compaction was determined. 5 mixes of soil-tailing were analyzed (M01-M05) and a Proctor curve was determined for each mix. The summary of results for the Standard Proctor assay performed to the 5 mixes of soil-tailing are shown in Table No 2.

TABLE NO 2

Proctor Standard Results

| Mezcla | M.H.C.D, $Kg/m^3$ | M.D.C.D, $Kg/m^3$ | Optimal Humidity % | Natural Humidity % |
| --- | --- | --- | --- | --- |
| M01(100% S) | 2.069 | 1.793 | 15.4 | 8.5 |
| M02(75% S, 25% R) | 2.132 | 1.838 | 16.0 | ND |
| M03(50% S, 50% R) | 2.128 | 1.846 | 15.3 | ND |
| M04(25% S, 75% R) | 2.130 | 1.867 | 14.1 | ND |
| M05(100% R) | 2.114 | 1.866 | 13.3 | 4.0 |

M.H.C.D: Maximal Humid Compacted Density;
M.D.C.D: Maximal Dry Compacted Density.

Example 3: Permeability Assay

For test tube confection, 2 kilograms of material for each test tube was considered, dosed at a rate of 130 L/m³ and water was added until it reached a density of 90% of the Standard Proctor, previously determined. It was established that before the assay execution, to allow the mixes plus the additive to react for a 24 h period. In a first instance it was realized according to the ASTM D 2432 regulation. The permeability study started with the 100% soil mix (M01), this material needed at least 2 days for complete saturation. Water entry was realized with a water load of 3 cm height (h) to avoid posterior turbulences and holes in the material, no water runoff was detected during the first 24 hours, after this, the hydraulic gradients (i) were increased to 0.3 (9 cm), 0.4 (12 cm) and 0.5 (16 cm). The obtained permeability results for mix M01 (100% soil) are presented in Table No 3.

The assay of the sample of the mining tailing 100% dry (M05), started with the sample saturation for 2 days with a water load (h) of 3 cm to avoid posterior turbulences and holes in the material. Like the soil sample, no water runoff was detected during the first 24 hours. After this, that water load was increased to 9 cm, that produced a slight water blooming after 24 hours of raised the level.

Lecture were done after three days of the beginning of the assay, increasing the hydraulic gradients (i) to 0.3 (9 cm) and 0.4 (12 cm). Permeability results of the 100% dry sample (M05) are presented in table No 3.

Each of the soil:mining tailing mixes prepared according the experimental design and with the additive applied were subjected to the same permeability continuous load test described before. The permeability results are shown in Table N 3.

TABLE 3

Permeability Results

| Mix | Additive | % Mining tailing | Permeability k(cm/s) |
| --- | --- | --- | --- |
| M1 | Control | 0 | 1.41E−04 |
| M2 | Control | 25 | 1.11E−05 |
| M3 | Control | 50 | 1.08E−06 |
| M4 | Control | 75 | 3.36E−07 |
| M5 | Control | 100 | 3.14E−05 |
| M1 | Additive | 0 | 1.29E−05 |
| M2 | Additive | 25 | 1.07E−05 |
| M3 | Additive | 50 | 8.19E−06 |
| M4 | Additive | 75 | 1.79E−07 |
| M5 | Additive | 100 | 1.35E−06 |

Figure 2:
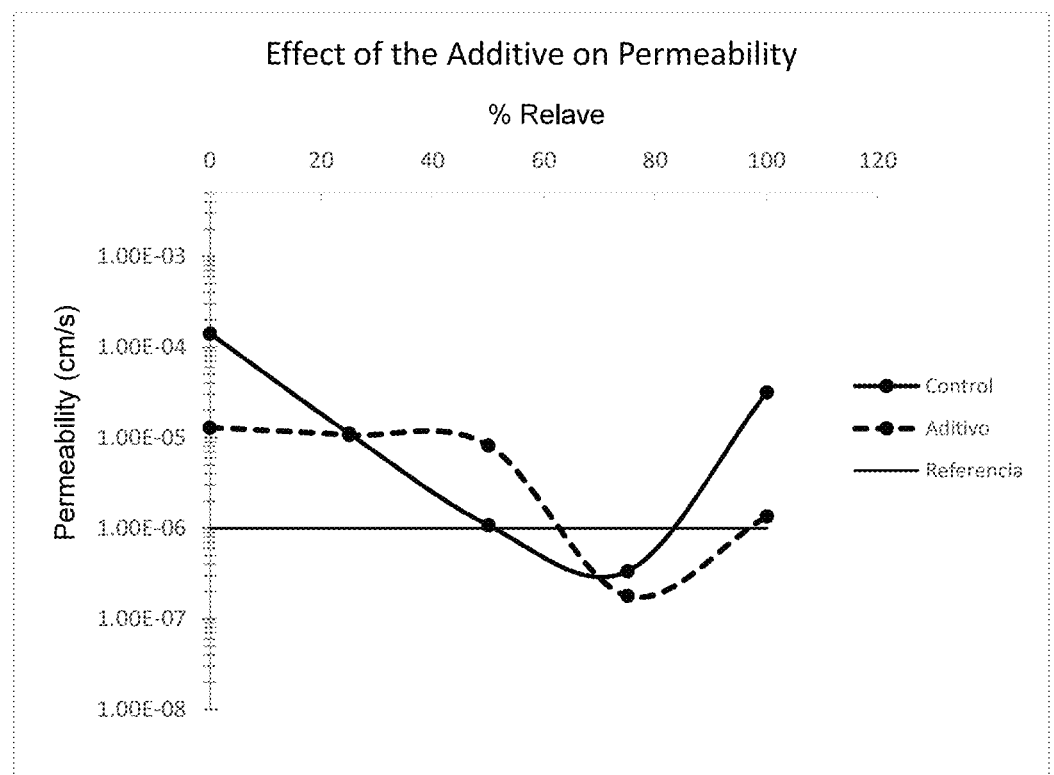
FIG. 2 shows the effect of the additive in the permeability of the mining tailings treated.
Figure 3:
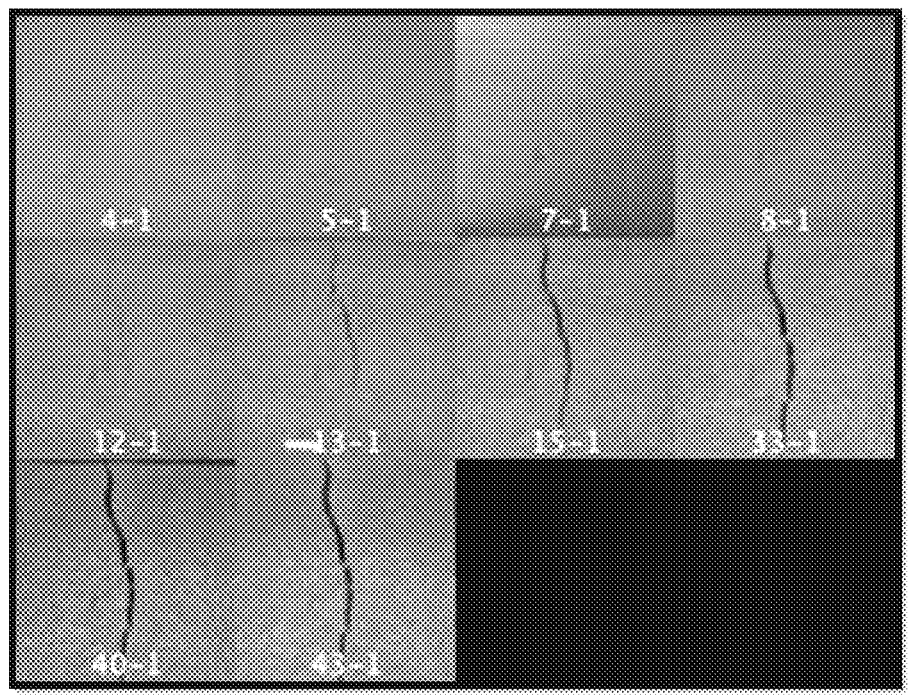
FIG. 3 shows the control treatment for the treated mining tailing: the tag indicates the day of assay and the cell number.
Figure 4:
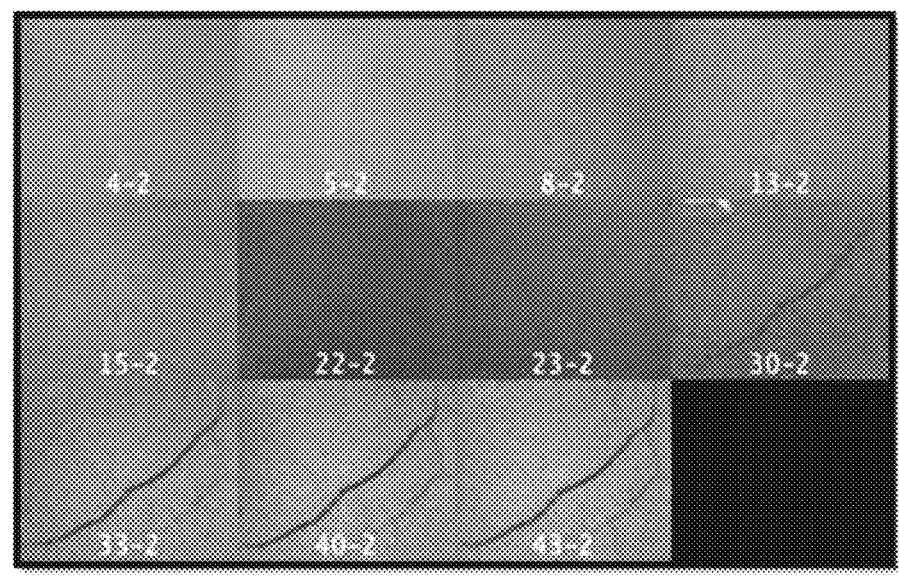
FIG. 4 shows the treatment with Dose 1 (0.11 L/Kg) of the treated mining tailing: the tag indicates the day of assay and the cell number.
Figure 5:
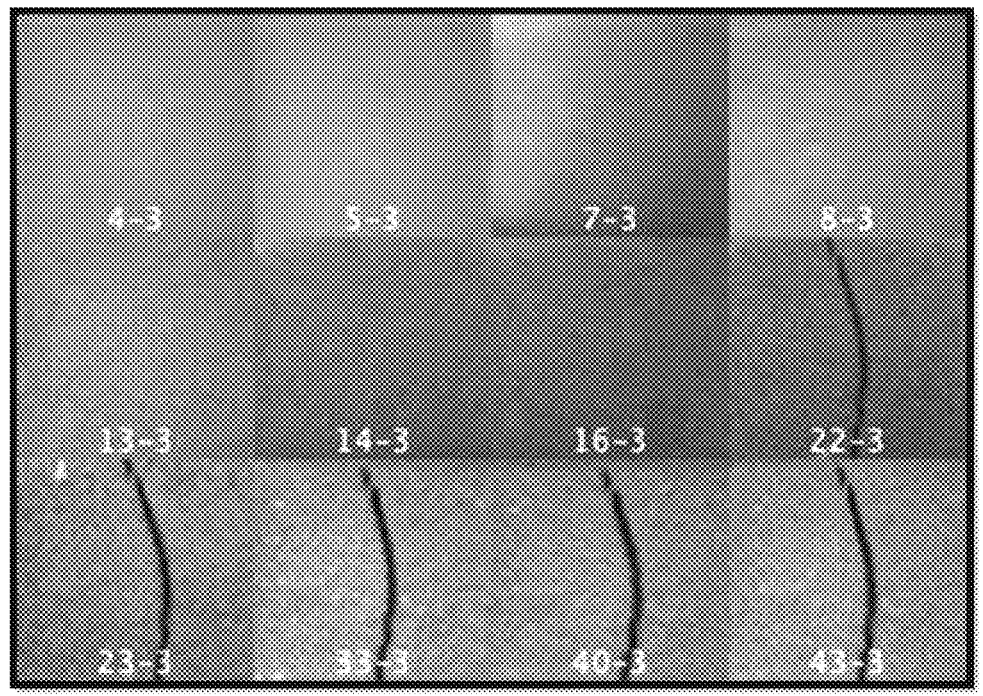
FIG. 5 shows the treatment with Dose 2 (0.21 L/Kg) of the treated mining tailing: the tag indicates the day of assay and the cell number.
Figure 6:
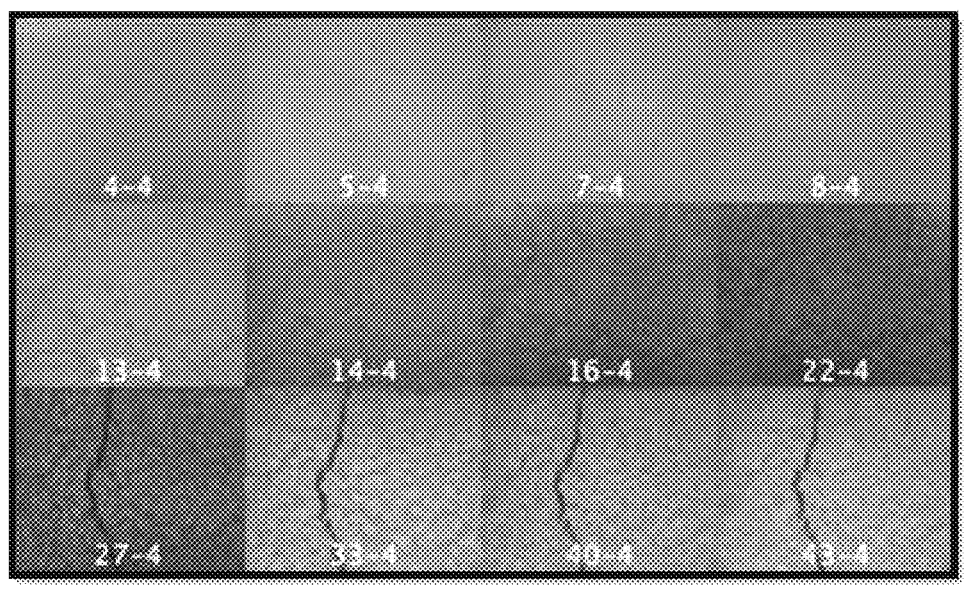
FIG. 6 shows the treatment with Dose 3 (0.42 L/Kg of the treated mining tailing: the tag indicates the day of assay and the cell number.

In FIG. 2 is possible to note that with a 75% of mining tailing in the soil:mining tailing mix the best results are obtained, showing an increase of the impermeability as compared with the mix with only mining tailing. This suggests that it has to be used a range of 50-75% of mining tailing in the soil:mining tailing mix.

Example 4: Cracking Reduction

Photographic monitoring: Daily photographic shots were taken to the cracking cells in order to be subsequently analyzed using the Image J software (This software allows to measure and quantify the picture colors by colorimetry, that is, it transform the color tone range in a quantifiable numeric scale) and obtain Ia cracking tendency in each condition.

In this assay 3 different additive Doses were used:
Dose 1: 0.11 L of Additive per pulp Kilo.
Dose 2:0.21 L of Additive per pulp Kilo
Dose 3: 0.42 L of Additive per pulp Kilo
Cracking Cell Monitoring:

Photographic analysis of the cracking cells: Following of the implicated area in the cracks formed in each cell was estimated from the distribution of the gray scale that delivers the colorimetric histogram of the pictures.

When the formation of cracks was observed in the central zone of each cell, it was possible to note that in the control cell, the crack appears after 12 days, being evident in day 15. In the cells with Additive, this time is prolonged until day 30, 22 and 27 for Dose 1, Dose 2 and Dose 3, respectively.

In the FIGS. 3 to 6, the tag indicates the assay day and cell number, in a way that 12-1 indicates the picture from day No 12 from cell 1, that is the control cell, meaning that:
Cell 1: Control
Cell 2: Dose 1
Cell 3: Dose 2
Cell 4: Dose 3

When observing the assemblies, it was possible to rapidly compare the day when cracks appeared, since the cracks appearance is visible to naked eye. The incorporation of the additive can retard the appearance of cracks.

Although this invention has been described under the modalities previously mentioned, it is evident that other alternatives, modifications or variations will render the same results, however, we have established that all the stages that conform the process to use the mining tailing as construction material conceding to it impermeabilizing and reducing its cracking, are fundamental to the success of the present invention here described. Consequently, the invention modalities pretend to be illustrative, but not restricting. A variety of changes can be done without moving away from the spirit and reach of the invention as is defined in the following claims.

What is claimed is:

1. A process to utilize mining tailing as construction material conceding to it impermeabilizing properties and reducing its cracking, the process consisting of:
    a) applying to a mix of soil-mining tailings to be treated a solution that contains calcium;
    b) applying to the mix of soil-mining tailing treated in step (a), a solution that includes bacteria selected from the genre *Bacillus* or the genre *Sporosarcina;*
    c) adding maltodextrin; and
    d) stabilizing, compacting, and drying off the treated mix of soil-mining tailing, wherein the solutions from steps a) and b) are applied by at least one of aspersion, mixes, or irrigation.

2. The process according to claim 1, wherein the maltodextrin is added at 30% weight per volume (w/v) to the bacterial solution.

3. The process according to claim 1, wherein said calcium-containing solution is applied at an rate from 40 to 150 L/m$^2$.

4. The process according to claim 1, wherein the solution that includes calcite-generating bacteria is applied at rate from 40 to 150 L/m$^2$.

5. The process according to claim 1, wherein the maltodextrin is added to confer more hardness to the construction material.

6. The process according to claim 1, wherein the stabilization of step d) is done for 24 to 72 hours.

* * * * *